Aug. 7, 1928.
J. H. WAGENHORST
1,679,454
VEHICLE WHEEL
Original Filed Aug. 9, 1920
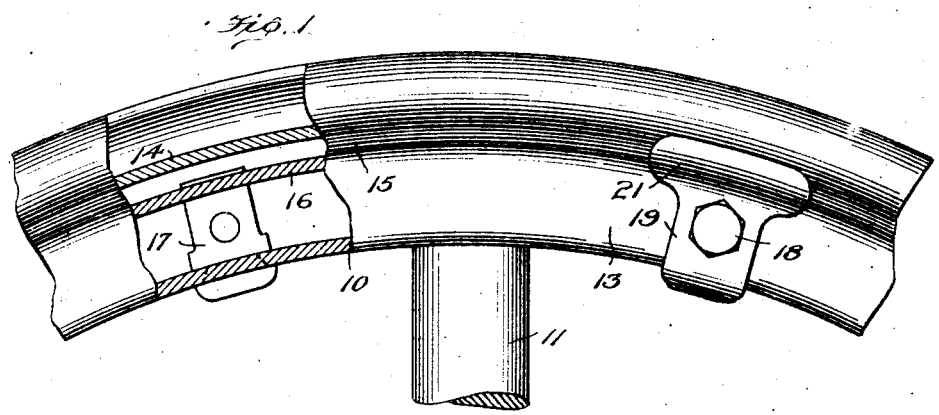
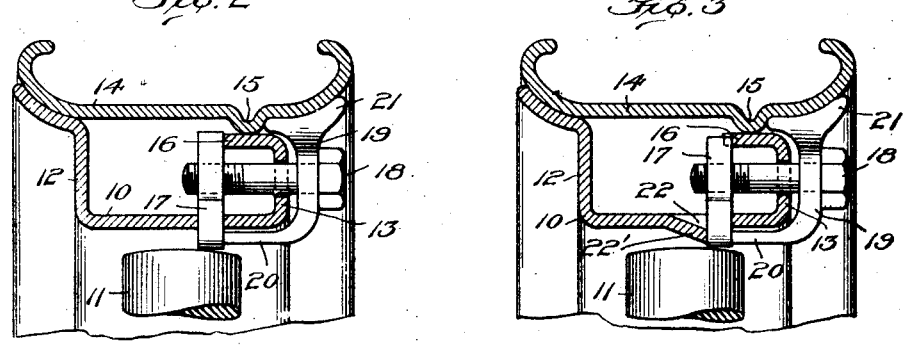
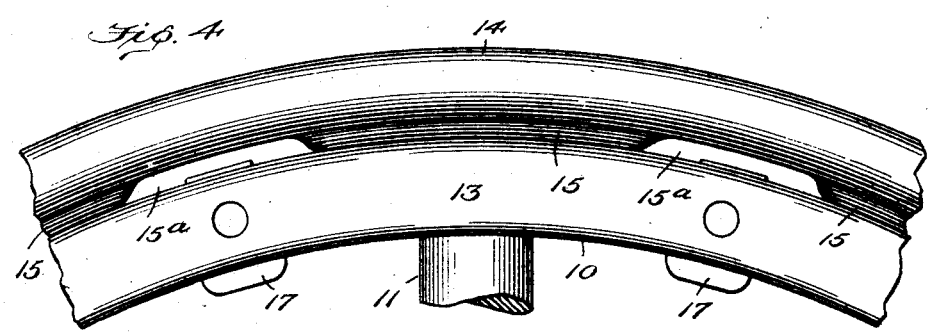
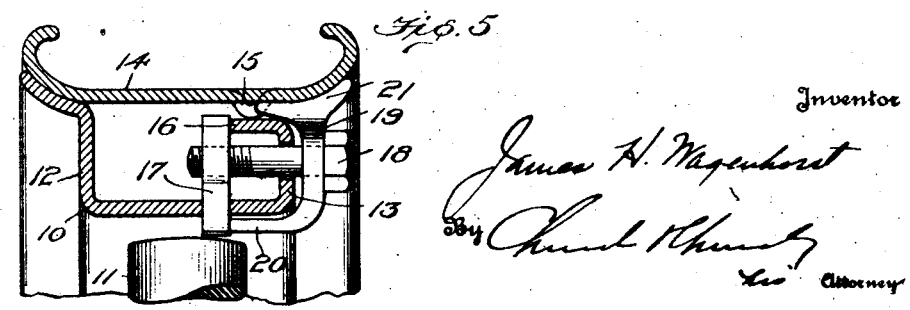

Patented Aug. 7, 1928.

1,679,454

UNITED STATES PATENT OFFICE.

JAMES H. WAGENHORST, OF JACKSON, MICHIGAN.

VEHICLE WHEEL.

Original application filed August 9, 1920, Serial No. 402,105. Divided and this application filed December 3, 1925. Serial No. 72,916.

This invention relates generally to vehicle wheels and, more particularly, to wheels having demountable tire-carrying rims, such as are now in common use in the automobile industry. One object of the invention is to provide a novel form of connection between the fixed rim or felly and the demountable tire carrying rim which connection will have the advantage of permitting the use of a comparatively short bolt, thereby reducing the cost of production of the fastening elements.

A further object is to secure a fulcruming action of the clamp or lug, when the same is being tightened to secure the tire carrying rim on the felly. In other words, the felly is provided with a fulcrum for the clamp or lug, this fulcrum, in the present instance, being constituted by the nut for the bolt which is used for drawing up said clamp.

With these and other objects in view, the invention consists in certain novel details of construction, and combinations and arrangements of parts all as will hereinafter be more fully described and the novel features thereof particularly pointed out in the appended claims.

In the accompanying drawings,

Figure 1 is a side elevation, partly in section, of a portion of a vehicle wheel to which the present invention is applied.

Fig. 2 is a transverse sectional view of the wheel illustrated in Fig. 1;

Fig. 3 is a view like Fig. 2 showing a modification of the construction illustrated in Figs. 1 and 2;

Fig. 4 is a view similar to Fig. 1 showing a still further modification;

Fig. 5 is a view simlar to Figs. 2 and 3 illustrating a cross section of the wheel shown in Fig. 4.

This application is a division of applicant's co-pending application, Serial No. 402,105, filed August 9th, 1920, Patent No. 1,646,777, Oct. 25, 1927.

In the several embodiments of the invention, there is the usual fixed rim or felly 10 carried by the spokes 11, this felly preferably being made of sheet metal and formed with front and rear legs 13, 12 on which the demountable tire carrying rim 14 is supported. The demountable rim makes a rather extended contact with the rear leg 12 but, by forming said rim with an inrolled bead 15, substantially a line contact is made between said rim and the inturned portion 16 of the front leg 13. It is not necessary to have contact of the rim at both front and rear legs and, in manufacture, it often happens that there is no contact, or a very incomplete contact at the bead 15 with the front leg. As before stated, the primary object of the present invention is to provide a connection between the felly 10 and demountable rim 14 wherein a comparatively short bolt may be used. This is accomplished by having the nut 17 of the bolt 18 located near the front leg 13 whereby it is unnecessary to have the bolt extend entirely across the felly.

Referring particularly to the form of the invention illustrated in Figs. 1 and 2, the base of the felly 10 is formed with an opening in which is received the nut 17, lateral movement of the nut being prevented by the edges of the opening as well as by the inturned portion 16 of the front leg against which said nut abuts. In this way, the nut is located comparatively close to the front leg 13, the headed bolt 18 extending through the clamp 19 and front leg 13 and only partially across the felly 10 with its inner end in threaded engagement with said nut. By turning the bolt in the proper direction, it will be apparent that the clamp can be drawn toward the felly so as to firmly secure the demountable rim on the felly.

Preferably, said clamp is formed with a head 21 for engaging the demountable rim and a toe 20 extending rearwardly under the base of felly 10, and the nut 17 projects radially inward through the base of said felly a sufficient distance to form an abutment or fulcrum for the toe 20 of said clamp. By having the clamp fulcrumed against this protruding portion of the nut, said clamp has somewhat of a pivotal movement, when the demountable rim is being secured on the felly.

In the form of the invention illustrated in Fig. 3, the opening 22 for the nut 17 is formed by punching in a portion 22′ of the base of the felly 10, very little, if any, of the metal being cut away or removed. The punched in portion 22′ of the felly engages the inner end of the nut 17 and backs it up when stress is applied to the nut by screwing up the bolt. In addition, the inturned portion 16 of the front leg 13 is cut away at the point where it is engaged by the nut 17 to form a notch. Turning of the nut on the bolt 18 is, therefore, prevented not only by the opening for the nut in the base of the rim but also by the end walls of the recess of the inturned portion 16 of flange 13.

In the other embodiment of the invention illustrated in Figs. 4 and 5, the inrolled bead 15 on the rim 14 is interrupted, as at 15ª, to permit entrance of the head 21 of the clamp between the rim and the adjacent portion of the flange on the felly. With this exception, this form of the invention is identical with that illustrated in Figs. 1 and 2 and no additional description of the clamp and its locking bolt and nut is deemed necessary.

From the foregoing, it will be seen that each of these constructions permit of much shorter bolts being employed thereby reducing the cost of the equipment and, while this reduction in cost, per bolt, may seem to be small, nevertheless, when it is remembered that these bolts must be produced by the millions the advantages of the invention will be apparent. In addition, by having the nut positioned near the outer flange 13 of the felly it is possible to have the nut also constitute a fulcrum for the lug or clamp, a feature which gives the invention a further advantage.

I claim:

1. The combination with a sheet metal felly, of a demountable tire carrying rim, a bolt, a clamp on said bolt, engaging the rim, and a fulcrum member for said clamp carried within said felly and projecting through the inner face thereof.

2. The combination with a sheet metal felly having outwardly disposed front and rear legs, of a demountable tire carrying rim supported on one of said legs, a bolt extending through one of said legs, a clamp on said bolt having one end adapted to engage said demountable rim, and a fulcrum member carried within the felly, and projecting through the inner face thereof, against which the other end of the clamp engages.

3. The combination with a sheet metal felly, of a demountable tire carrying rim, a clamp engaging said rim, a bolt extending through said clamp and partially across said felly, and a nut carried in said felly with which said bolt engages, said nut projecting through the base of said felly and forming a fulcrum against which said clamp also engages.

4. The combination with a sheet metal felly, of a demountable tire carrying rim, a clamp engaging said rim, a nut carried by the felly, and a bolt extending through said clamp and engaging said nut, said nut projecting through the base of said felly and forming a fulcrum for said clamp.

5. The combination with a sheet metal felly having an opening in its base, a demountable tire carrying rim on said felly, a nut positioned in the opening in said felly, and projecting beyond the base of the latter, a clamp, one end of said clamp engaging said rim and the other end thereof being fulcrumed against the projecting portion of said nut, and a bolt extending through said clamp and partially across the felly, the inner end of said bolt engaging in said nut.

JAMES H. WAGENHORST.